INTEGRATED TRANSFORMER TRANSDUCER

Filed May 8, 1963

Inventors
R. NAYLOR
G. G. SCARROTT
By
Cameron, Kerkam & Sutton
Attorneys 3,349,382
Patented Oct. 24, 1967

3,349,382

INTEGRATED TRANSFORMER TRANSDUCER

Ronald Naylor, Cheadle, and Gordon George Scarrott, Wokingham, England, assignors to Ferranti, Limited, Lancashire, England, a company of the United Kingdom of Great Britain and Northern Ireland Filed May 8, 1963, Ser. No. 278,877
Claims priority, application Great Britain, May 12, 1962, 18,333/62
6 Claims. (Cl. 340—174.1)

This invention relates to electromagnetic transducers and specifically to transducer units including the transducer itself, in the form of a recording or reading head, together with an associated transformer and the connections between it and the head, for a magnetic storage system of the kind which in operation presents a storage medium, such as a tape, disc, or drum, having a surface moving relative to the transducer.

A recording head unit for such a storage system must be designed and energised to produce in the storage medium a magnetic field large enough to change the state of magnetisation of the medium. For a given strength of energisation there is for each unit a region of the medium in which the magnetic field strength is large enough to do this and so record an item of information. The length of this region in the direction of motion of the medium may be referred to as the resolution distance, D. Similarly, for a given speed, V, of motion there is a resolution time, T, available for reversing the field set up by the head, this being the time during which each element of the medium is within the resolution distance. Hence $T=D/V$, approximately.

A reading head for such a storage system should be efficient in producing substantially the maximum output signal procurable from the record.

An object of the invention is accordingly to provide for a magnetic storage system of the kind specified a transducer unit which when used for recording is such that the desired resolution distance and resolution time are attained for substantially the minimum expenditure of electrical energy.

Another object is to provide for such a storage system a transducer unit which when used for reading is especially efficient in reproducing the recorded signals.

In accordance with the present invention, and electromagnetic transducer unit for a magnetic storage system of the kind which in operation presents a storage medium having a surface moving relative to the transducer includes the transducer itself in the form of a planar electrically conductive strip arranged for location with one of its narrower longitudinal surfaces closely parallel to the storage surface with the broader longitudinal surfaces of the strip normal to the direction of movement of the medium in the vicinity of the transducer, and a transformer having a winding in the form of an open-ended loop of cylindrical form the ends of which loop are joined to the ends of said strip, each to each, by a pair of interconnecting members which are broad in the direction of said movement and are shaped to limit to the vicinity of the transducer the magnetic field set up by it when used as a recording head, the central region of the strip being embedded in electrically non-conductive material of high permeability leaving said one narrower surface exposed.

Figure 1:
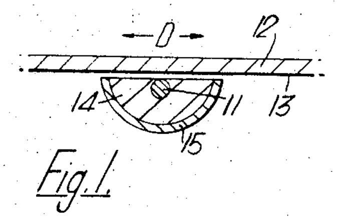
Figure 2:
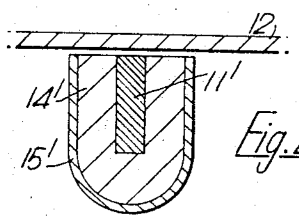
Figures 3, 4, 5, 6:
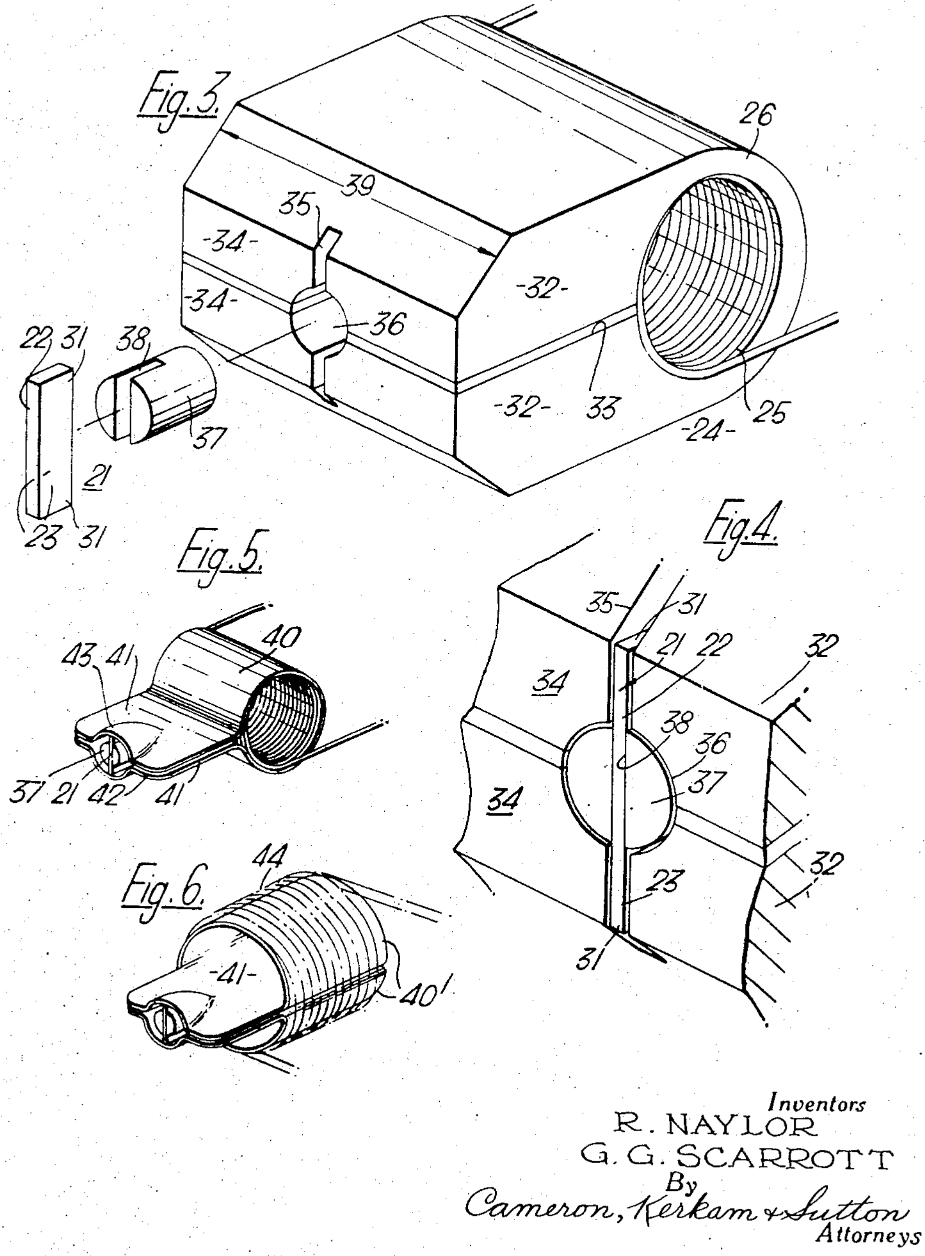

In the accompanying drawings,

FIGURES 1 and 2 show in section recording heads to illustrate the principle of the invention, FIGURE 3 shows in exploded form a recording head unit in accordance with one embodiment of the invention, FIGURE 4 shows part of the embodiment of FIGURE 3 with the components assembled, and FIGURES 5 and 6 illustrate two further embodiments.

A transducer unit in the form of a recording head with the associated transformer and interconnections in accordance with one embodiment of the invention will now be described with reference to FIGS. 1 to 4 of the accompanying drawings.

The simplest recording device which would satisfy the resolution distance criterion set forth above would be as shown in FIGURE 1. Here the head itself is in the form of a straight conductor 11 of circular section, assumed to be extending normal to the plane of the paper and to the direction of movement of the storage medium 12, which is assumed to be magnetic tape in straight-line motion in at least the vicinity of the head. The conductor is located as close as possible to the surface 13 of the tape and is of a diameter less than the resolution distance D. To minimise the total stored magnetic energy in the space around the head remote from the tape this space is filled with an electrically non-conductive material 14, such as a ferrite, of high permeability.

As the field would normally be too weak to have any appreciable effect at a range of, say, 5D in the direction of motion, the stored energy is further reduced by limiting the field to the immediate vicinity of the head. This is achieved by placing a semicylindrical sheet 15 of copper around the back of conductor 11. Their far ends, as viewed in the drawing, are connected together and their near ends are connected to the secondary of the energising transformer (not shown) of the unit. Conductor 11 and sheet 15 thus form a loop with the sheet acting as the return path for returning the recording current in the conductor.

The arrangement of FIGURE 1 is such as to attain the desired resolution distance for a minimum stray field. It is however further necessary to minimize the total electric input, which has not only to supply the magnetic energy but also to make good the resistance losses. The magnetic energy is proportional to the inductance L of that part of the secondary loop constituted by the head 11 and the return connection formed by the copper sheet 15. This inductance, together with the resistance R of the loop (which is mostly in the head itself), define a time constant $L/R$. If this is much less than T the voltage which must be applied to the loop to overcome R is large compared with that required to build up the recording current in the time T. Accordingly the electrical input may be reduced by increasing the cross sectional area of the head as shown at $11^1$ in FIGURE 2, the increase being preferably in the direction away from the tape so as not to increase the response distance. The shapes of the copper sheet $15^1$ and ferrite $14^1$ are correspondingly modified. The total stored magnetic energy is little affected, but the resistance of the copper conductor is reduced. With the resistance reduced, the value of the time constant $L/R$ is brought closer to T, there being an optimum value of the cross sectional area of the head at which the two are approximately equal and for which, as a result, the electrical input energy is a minimum. A mathematical analysis gives the ratio of the sectional dimensions of the head as about 15, the actual values in a typical case being 0.001 inch thick by 0.015 inch deep—that is, in direction away from the storage medium.

A practical realization of the arrangement of FIGURE 2 in accordance with one embodiment of the invention will now be described by way of example with reference to FIGURE 3, which shows a head unit in exploded form, with the storage medium assumed again to be magnetic tape.

The recording head 21 takes the form of a short length of planar copper strip approximately 0.001" x 0.015" section, one of the two narrower longitudinal surfaces 22 of which (of breadth 0.001") is in operation located closely parallel to the tape with the broader longitudinal surfaces 23 (of breadth 0.015") of the strip normal to the direction of tape movement. To energise the head there is provided a transformer 24 the primary winding of which is in the form of a single-layer helix 25. Surrounding this winding is the secondary winding in the form of an open-ended loop 26 of cylindrical form the ends of which are joined to the ends 31 of surfaces 23 of the head, each to each, by a pair of interconnecting members 32. Secondary 26 and interconnections 32 are conveniently formed in one piece by drilling a solid copper block to take the primary winding and making a radial cut to form a gap 33 to open the ends of the secondary loop and separate the connections 32 from one another. This gap is filled with insulation.

The front surfaces 34 of connections 32 are slotted centrally at 35, in a direction normal to gap 33, to take head 21 sideways on. The junction of slot and gap is drilled to form a recess 36 in order to accommodate a plug 37 of high permeability ferrite material the outer end of which is slotted at 38 to take the head sideways on.

On assembly, the unit is as shown in part in FIGURE 4. The ferrite plug 37 is contained within recess 36. The head 21 lies in slot 35, the ends of which tightly engage the end regions 31 of surfaces 23 of the head (clearances are shown for clarity) to complete the electrical connections to it from connections 32 and hence from the secondary winding. The central region of the head is embedded in plug 37 to a depth which leaves only surface 22 exposed, flush with the front surfaces 34 of connections 32 and of the plug.

The arrangement is thus the practical equivalent of that of FIGURE 2. The ferrite 14$^1$ of FIGURE 2 is now in the form of the ferrite plug 37 of FIGURE 3. The shielding function of the copper sheet 15$^1$ is now exercised by interconnections 32, which are made broad enough in the direction 39 of the movement of the storage medium to limit to the immediate vicinity of the head 21 the magnetic field resulting from the energisation of the transformer. To ensure the maximum shielding effect, the interconnecting members 32 are shaped to make gap 33 as narrow as is practicable, except of course in the vicinity of the head.

An alternative construction is shown in FIGURE 5. Interconnections 32 between secondary 40, now in strip form, and head are now in the form of closely-parallel strips or plates 41 separated again by insulation in the gap 42 and extending as before in the direction of movement for shielding purposes. At the centre of their front edges the plates are bent away from one another as shown at 43 to accommodate the head 21 and ferrite plug 37. The electrical connections from connections 41 are now made to the end edges of the head. The operation is as before.

The arrangement of FIGURE 5 may itself be modified as shown in FIGURE 6 to allow the primary winding to be applied to the outside of the secondary winding. For this reason the single-turn secondary loop 40 of FIGURE 5 is turned at right angles as shown at 40$^1$ in FIGURE 6 to extend from one end side of one of the plates 41 to the adjacent side of the other plate. The single-layer helical primary winding is applied to the outside of the secondary winding as indicated in broken lines at 44.

Where the storage medium is a rotating drum, the broader surfaces 23 of the head are again arranged to be normal to the direction of movement of the storage medium in the vicinity of the head; these surfaces are therefore normal to the tangent to the nearest point of the drum surface.

Where the storage medium is of disc form, the surfaces extend approximately radially with respect to the disc axis.

A transducer unit which fulfils the design requirements described above for a recording head, also serves efficiently as a reading head unit, in that it delivers more electrical power than is provided by known types of transducer when operating under like conditions. When the transducer is used in this way, of course, the windings which serve as the primary and the secondary windings when the transducer is used for recording purposes now serve as the secondary and primary windings, respectively.

What we claim is:

1. An electro-magnetic transducer unit for a magnetic storage system of the kind which in operation presents a storage medium having a surface moving relative to the transducer including the transducer itself in the form of a planar electrically conductive strip arranged for location with one of its narrower longitudinal surfaces closely parallel to the storage surface and with the broader longitudinal surfaces of the strip normal to the direction of movement of the medium in the vicinity of the transducer, and a transformer having a winding in the form of an open-ended loop of cylindrical form, a pair of integral interconnecting members extending from said open-ended loop and joining the ends of said loop to the ends of said strip, each to each, the central region of the strip being embedded in electrically non-conductive material of high permeability leaving said one narrower surface exposed, said non-conductive material being wholly enclosed by said pair of interconnecting members except for one surface in the plane of said one narrower surface, said pair of interconnecting members being broad enough in the direction of said movement and additionally so shaped as to limit to the vicinity of the transducer the magnetic field set up by it when used as a recording head.

2. A transducer unit as set forth in claim 1 wherein said interconnecting members substantially enclose all but the said one narrower exposed surfaces of said strip.

3. A transducer unit as claimed in claim 1 wherein the sectional dimensions of said strip are in the approximate ratio fifteen to one.

4. A transducer unit as claimed in claim 1 wherein except in the vicinity of the transducer the interconnecting members are separated from one another by a narrow gap filled with insulating material.

5. A transducer unit as claimed in claim 1 wherein said winding and the interconnecting members are in block form, the end regions of the transducer strip lying in slots formed in those members.

6. A transducer unit as claimed in claim 1 wherein said winding and the interconnecting members are in strip form, the members being bent away from one another in the vicinity of the transducer.

References Cited

UNITED STATES PATENTS

| | | | |
|---|---|---|---|
| 2,479,308 | 8/1949 | Camras | 179—100.2 |
| 2,532,100 | 11/1950 | Howell | 179—100.2 |
| 2,536,272 | 1/1951 | Friend | 179—100.2 |
| 2,539,400 | 1/1951 | Camras | 179—100.2 |
| 2,694,109 | 11/1954 | Wiegand | 179—100.2 |
| 3,157,748 | 11/1964 | Eldredge | 340—174.1 |

TERRELL W. FEARS, *Primary Examiner.*

JAMES W. MOFFITT, BERNARD KONICK, *Examiners.*

V. P. CANNEY, *Assistant Examiner.*